Oct. 30, 1945. J. F. OLIN 2,388,217
SEPARATION OF TRIMETHYL AMINE AND AMMONIA
FROM AMINATION REACTION MIXTURES
Filed Feb. 26, 1943
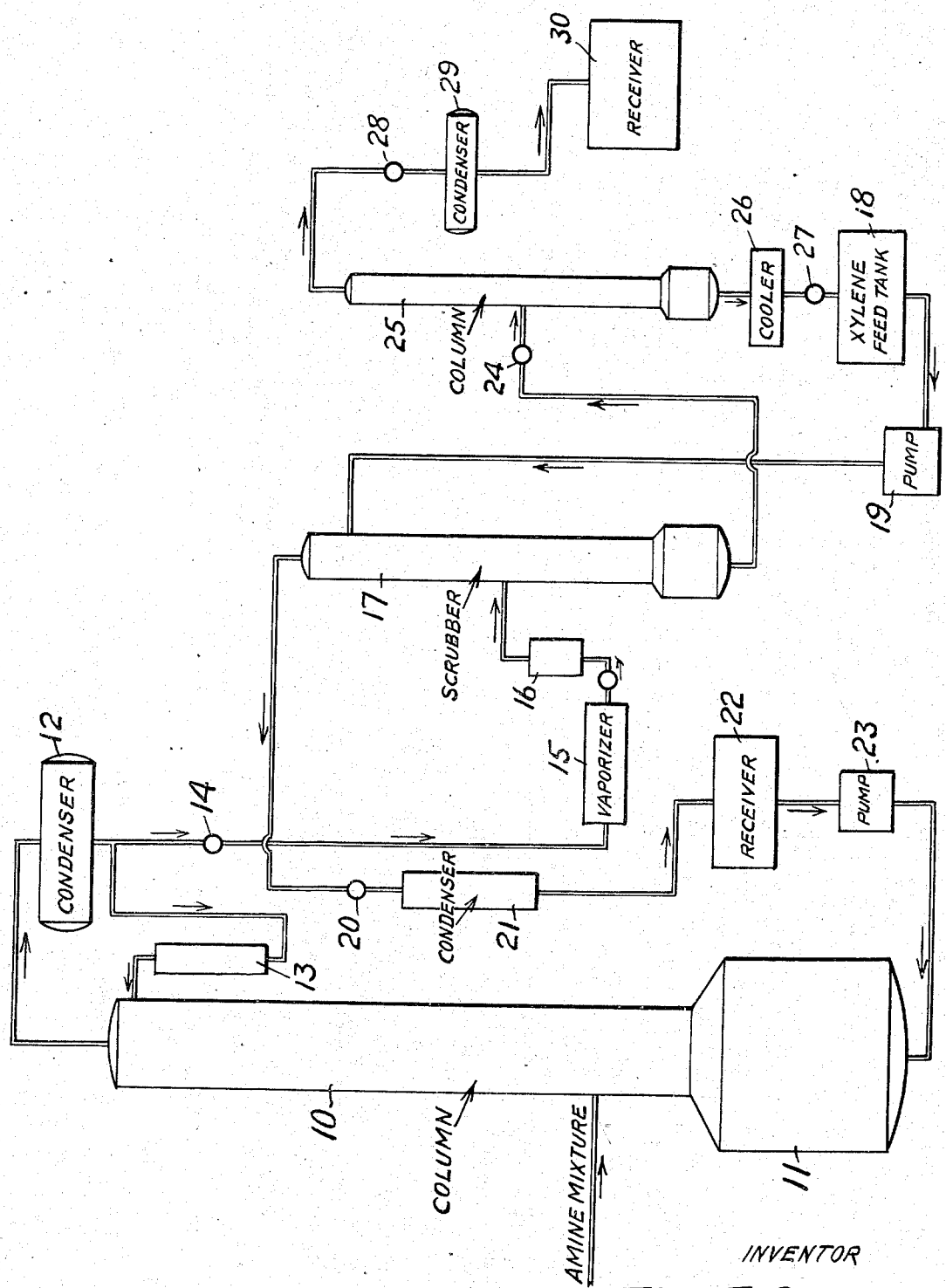
INVENTOR
John F. Olin
BY
Maurice A. Crews
ATTORNEY Patented Oct. 30, 1945

2,388,217

UNITED STATES PATENT OFFICE 2,388,217

SEPARATION OF TRIMETHYL AMINE AND AMMONIA FROM AMINATION REACTION MIXTURES

John F. Olin, Grosse Ile, Mich., assignor to Sharples Chemicals Inc., Philadelphia, Pa., a corporation of Delaware Original application September 2, 1942, Serial No. 457,053. Divided and this application February 26, 1943, Serial No. 477,268

6 Claims. (Cl. 202—41)

The present invention pertains to separation of ammonia and trimethyl amine from each other and from other constituents obtained in the mixture resulting from alkylation of ammonia and lower methyl amines. Reaction mixtures resulting from alkylation of ammonia by catalytic reaction thereof in vapor phase with methanol or methyl ether ordinarily contain all three of the methyl amines and also contain a considerable quantity of ammonia. The present invention is concerned with the separation of ammonia and trimethyl amine from reaction mixtures of this type and from other mixtures containing said constituents. This application is a division of my prior application Serial No. 457,053, filed September 2, 1942, for Purification of amine reaction mixtures.

As is well known to those skilled in the art, the separation of ammonia and trimethyl amine from reaction mixtures containing these constituents and from each other is complicated and rendered difficult by the fact that ammonia forms with trimethyl amine a constant boiling mixture. While all of the trimethyl amine may be removed from a crude reaction mixture containing the three methyl amines and ammonia by the simple procedure of adding sufficient ammonia to carry off all of the trimethyl amine in the form of a constant boiling mixture with ammonia, such procedure leaves unsolved the problem of separating the trimethyl amine of the constant boiling mixture from the ammonia. The present invention provides a procedure by which this separation may be efficiently accomplished, and it also provides procedure by which ammonia which is separated from the trimethyl amine is returned to the distillation step to assist in carrying overhead a further quantity of trimethyl amine. After all of the trimethyl amine has been removed by continued operation in this manner, the remaining amines and ammonia of the reaction mixture can be very readily separated from each other by straight-forward distillation procedure.

In the practice of the invention, a mixture containing trimethyl amine and ammonia is extracted by an aromatic hydrocarbon solvent to effect selective solution of the trimethyl amine in that solvent. While any aromatic hydrocarbon solvent having the desired selective solvent power may be employed in the practice of the invention, the preferred solvents are xylene, toluene and benzene. The aromatic hydrocarbon solvent may be mixed with the reaction mixture containing ammonia, trimethyl amine, mono-methyl amine and/or dimethyl amine prior to any attempt to separate these constituents from each other by distillation, and the ammonia distilled from the resulting solution containing trimethyl amine dissolved in the aromatic hydrocarbon, but this method of operation is less efficient than my preferred embodiment, which involves passage of ammonia and trimethyl amine overhead as a constant boiling mixture from higher boiling constituents of the reaction mixture. When the ammonia and trimethyl amine are first passed overhead as a constant boiling mixture, they may be contacted in counter-flow relationship with the extracting aromatic hydrocarbon solvent by passage upwardly in vapor phase through a distillation column in counter-current relationship to a descending liquid phase stream of the solvent. By operating in this manner, the ammonia may be maintained in vapor phase and returned to the initial step of distillation to assist in carrying overhead a further quantity of trimethyl amine, while the solution of trimethyl amine in aromatic hydrocarbon passes to the base of the second column and is thence passed to a further distillation column in which the trimethyl amine may be separated from the aromatic hydrocarbon solvent.

The detailed nature of the invention and the preferred means for practicing it will be better evident from consideration of the following detailed description in the light of the attached flow sheet, in which the single figure illustrates the practice of the invention as applied in separation from each other of a mixture containing mono-methyl amine, di-methyl amine, tri-methyl amine and ammonia.

As illustrated in the flow sheet, the reaction mixture containing trimethyl amine and ammonia and also containing mono-methyl amine, di-methyl amine or both, is first passed to the distillation column 10, which is provided with a pot 11. Ammonia is also passed to this column and carries trimethyl amine contained in the reaction mixture reaching the column 10 overhead in the form of an azeotropic mixture. The mixture passing overhead from column 10 is passed to a condenser 12, from which condensate is returned through the reflux meter 13 to the top of the column 10. The condensed mixture of trimethyl amine and ammonia is passed through valve 14, vaporizer 15 and meter 16 to a central portion of a scrubbing column 17. An aromatic hydrocarbon which is a selective solvent for the trimethyl amine passed to column 17 is introduced toward the top of that column, xylene, toluene and benzene being the preferred solvents. Xylene from tank 18 may be passed by pump 19 into the top of distillation column 17, as illustrated. The xylene extracts the major portion of the trimethyl amine from its mixture with ammonia during descent of the xylene through the column, the ammonia passing overhead through valve 20 to condenser 21 from which it may be passed to receiving tank 22 and ultimately returned to the pot 11 by pump 23, to assist in carrying overhead a further quantity of trimethyl amine from the material introduced into the column 10 for treatment therein. The overhead fraction from column 17 contains a very small proportion of trimethyl amine, and return of the overhead fraction to the pot 11 is desirable in order that this trimethyl amine may be recovered, in addition to the advantage afforded by such return in assisting in removal of trimethyl amine overhead from column 10.

The solution of trimethyl amine in xylene obtained by the scrubbing operation in the column 17 is passed from the base of that column through valve 24 to a column 25, where the trimethyl amine is separated from the xylene by distillation, the xylene being passed as a condensate through cooler 26 and valve 27 to the xylene storage tank 18, while the trimethyl amine is passed overhead through valve 28 and condenser 29 to the crude trimethyl amine receiving tank 30. The trimethyl amine fraction passed to the receiver 30 will contain a small proportion of ammonia, and it is preferably redistilled to provide an overhead fraction consisting of an azeotropic mixture of ammonia and trimethyl amine, with substantially pure trimethyl amine as the distillation residue.

Best results in operation of the process as described above have been attained in cases in which the column 10 was operated as a continuous distillation column under a gauge pressure of 250 pounds per square inch, the column 17 operated as a continuous scrubbing column under a gauge pressure of 200 pounds per square inch, and the column 25 operated at a gauge pressure of 50 pounds per square inch. The pressure in the column 17 may be regulated by adjustment of the valve 20 and the pressure in the column 25 by adjustment of the valve 28. The liquid levels in the columns 17 and 25 may be maintained substantially constant during the continuous extracting and distillation operations by the valves 24 and 27, respectively.

After removal of the trimethyl amine and ammonia in the manner described above, the mono- and di-methyl amines and ammonia remaining in the pot 11 may be separated from each other by distillation.

Example 323 pounds of a crude methyl amine mixture, containing mono-, di-, and tri-methyl amine, together with ammonia, were obtained by catalytic reaction between methanol and ammonia, followed by preliminary distillation of the resulting reaction mixture. This crude methyl amine mixture was fed, together with 122 pounds of ammonia, to the column 10, and trimethyl amine was distilled overhead from this column, together with the ammonia, as an azeotropic mixture. A good reflux was maintained in the column 10 by proper adjustment of the heat to the pot 11 and of the cooling water used to cool the gases passed through the condenser 12. The mixture of ammonia and trimethyl amine was passed through vaporizer 15 to scrubber 17, which was maintained at about 225° C. Xylene was continuously fed to the top of the scrubbing column 17 as illustrated on the flow sheet. Operation was continuously conducted under these conditions, with removal of ammonia overhead through condenser 21 until concentration of the trimethyl amine in the distillate from the column 10 dropped to 5%. When this condition was reached, feed of further reaction mixture to the column 10 was discontinued, and the remaining material in pot 11 was fractionally distilled. The following cuts were obtained as the result of this distillation:

| Cut No. | Wt., pounds | Material |
| --- | --- | --- |
| 1 | 90.5 | NH₃ containing 6% (CH₃)₃N. |
| 2 | 26.5 | NH₃ and CH₃NH₂. |
| 3 | 34 | CH₃NH₂ (98% pure). |
| 4 | 45.5 | CH₃NH₂ and (CH₃)₂NH. |
| 5 | 89.5 | (CH₃)₂NH (99+% pure). |

During the scrubbing operation performed in the column 17, the solution of trimethyl amine in xylene removed from the base of this column was passed continuously to column 25, where it was distilled to separate the trimethyl amine from the xylene. The overhead fraction of this distillation, consisting of 154 pounds of product analyzing about 4% ammonia and 96% trimethyl amine was collected in receiver 30.

Various modifications are possible within the scope of the invention, and I do not therefore wish to be limited except by the scope of the following claims.

I claim:

1. In the separation of ammonia from a mixture containing ammonia and trimethyl amine, the process comprising selectively extracting trimethyl amine from the mixture by dissolving said trimethyl amine in an aromatic hydrocarbon solvent chosen from the class consisting of xylene, toluene and benzene and separating ammonia from the resulting solution by distillation.

2. In the separation of ammonia and trimethyl amine from a mixture containing them, and from each other by steps including distilling a constant boiling mixture of ammonia and trimethyl amine overhead from higher boiling constituents, the process comprising selectively extracting trimethyl amine from the mixture thereof with ammonia passed overhead by dissolving said trimethyl amine in an aromatic hydrocarbon solvent chosen from the class consisting of xylene, toluene and benzene and separating ammonia from the resulting solution by distillation.

3. A process as defined in claim 1, in which the selective extraction of the trimethyl amine is accomplished by passing a vapor phase mixture of the trimethyl amine and ammonia in counter-current relationship to a descending stream of the aromatic hydrocarbon solvent in a distillation column.

4. In the separation of ammonia and trimethyl amine from a mixture containing them, and from each other by steps including distilling a constant boiling mixture of ammonia and trimethyl amine overhead from higher boiling constituents, the process comprising selectively extracting trimethyl amine from the mixture thereof with ammonia passed overhead by passing said overhead mixture in vapor phase in counter-current relationship to a descending stream of an aromatic hydrocarbon solvent chosen from the class consisting of xylene, toluene and benzene in a distillation column.

5. In the separation of ammonia and trimethyl amine from a mixture containing them and containing at least one other methyl amine by steps including distilling a constant boiling mixture of ammonia and trimethyl amine overhead from said other methyl amine, the process comprising selectively extracting trimethyl amine from the mixture thereof with ammonia passed overhead by passing said overhead mixture in vapor phase in counter-current relationship to a descending stream of an aromatic hydrocarbon solvent chosen from the class consisting of xylene, toluene and benzene in a distillation column.

6. In the separation of ammonia from a mixture containing ammonia and trimethyl amine, the process comprising selectively extracting trimethyl amine from the mixture by dissolving said trimethyl amine in an aromatic hydrocarbon solvent chosen from the class consisting of xylene, toluene and benzene and separating ammonia from the resulting solution.

JOHN F. OLIN.